United States Patent
Orozco Cervantes et al.

(10) Patent No.: US 11,733,974 B2
(45) Date of Patent: Aug. 22, 2023

(54) METHOD AND SYSTEM FOR AUTOMATICALLY CREATING INSTANCES OF CONTAINERIZED SERVERS

(71) Applicant: HCL America Inc., Sunnyvale, CA (US)

(72) Inventors: Cesar Ivan Orozco Cervantes, Zapopan (MX); Gloria Lizzete Avila Patron, Zapopan (MX); Manuel Sebastian Parrao Alcantara, Zapopan (MX)

(73) Assignee: HCL America Inc., Sunnyvale, CA (US)

(*) Notice: Subject to any disclaimer, the term of this patent is extended or adjusted under 35 U.S.C. 154(b) by 107 days.

(21) Appl. No.: 17/347,708

(22) Filed: Jun. 15, 2021

(65) Prior Publication Data
US 2022/0398070 A1 Dec. 15, 2022

(51) Int. Cl.
*G06F 8/30* (2018.01)
*G06F 8/60* (2018.01)
*G06F 21/53* (2013.01)
*G06F 8/61* (2018.01)

(52) U.S. Cl.
CPC .............. *G06F 8/30* (2013.01); *G06F 8/60* (2013.01); *G06F 8/63* (2013.01); *G06F 21/53* (2013.01)

(58) Field of Classification Search
None
See application file for complete search history.

(56) References Cited

U.S. PATENT DOCUMENTS

| | | | |
|---|---|---|---|
| 10,922,090 B1* | 2/2021 | Lieberman | G06F 9/455 |
| 2018/0225095 A1* | 8/2018 | Kamalakantha | G06F 8/60 |
| 2019/0114164 A1* | 4/2019 | Wong | G06F 8/658 |
| 2021/0216583 A1* | 7/2021 | Wu | G06F 16/122 |
| 2022/0091572 A1* | 3/2022 | Biernat | G06F 9/5083 |
| 2022/0147560 A1* | 5/2022 | Chen | G06F 16/535 |

OTHER PUBLICATIONS

Sofija Simic, "List of Docker Commands: Cheat Sheet", 2019, phoenixnap (Year: 2019).*

* cited by examiner

*Primary Examiner* — Lewis A Bullock, Jr.
*Assistant Examiner* — Mark A Gooray (57) ABSTRACT

Method and system of automatically creating an instance of a containerized server within an Integrated Development Environment (IDE) is provided. The method includes registering a containerized server in a framework, upon a request from a server developer and creating a docker image from within IDE upon a first request from an end user. The docker image includes metadata corresponding to a project and includes project runtime ID and list of exposed ports. The method includes creating a docker container from within IDE upon a second request from end user, using docker image and based on metadata. The method further includes automatically creating and upon creating the docker container, an instance of the containerized server within the IDE by executing a wrapper class corresponding to the project runtime ID and to the containerized server. The containerized server corresponds to the docker container and wrapper class may be executed by the framework.

15 Claims, 7 Drawing Sheets

METHOD AND SYSTEM FOR AUTOMATICALLY CREATING INSTANCES OF CONTAINERIZED SERVERS

TECHNICAL FIELD

This disclosure relates generally to containerized servers, and more particularly relates to method and system for automatically creating instances of containerized servers.

BACKGROUND

Recently, most web servers available in the market are containerized, such as, Liberty, Node.js, Glassfish, and Node-RED. Typically, when a user, such as a software developer, tries to use such web servers to develop applications in an Integrated Development Environment (IDE), a common scenario may be to create a server connection that points to a web server (or server) inside a docker container. The IDE may allow the user to create the docker container. However, the user may be clueless on how to deploy code to whatever server is running in the docker container. Further, each server type has its own intricacies and there is no standardized or generic way to create an instance of the servers. Therefore, the user may need to spend time investigating on how to connect to a new server.

Accordingly, there is a need for method and system for automatically creating instances of containerized servers within the IDE when a new docker container is created.

SUMMARY

In accordance with an embodiment, a method of automatically creating an instance of a containerized server within an IDE is disclosed. The method may include registering a containerized server in a framework, upon a request from a server developer. The method may further include creating a docker image from within the IDE upon a first request from an end user. In accordance with an embodiment, the docker image may include metadata corresponding to a project. In accordance with an embodiment, the metadata may include a project runtime ID and a list of exposed ports. The method may further include creating a docker container from within the IDE upon a second request from the end user, using the docker image and based on the metadata. The method may further include automatically creating and upon creating the docker container, an instance of the containerized server within the IDE by executing a wrapper class corresponding to the project runtime ID and to the containerized server. In accordance with an embodiment, the containerized server may correspond to the docker container. In accordance with an embodiment, the wrapper class may be executed by the framework.

In accordance with an embodiment, a system of automatically creating an instance of a containerized server within an IDE is disclosed. The system may include a processor and a memory communicatively coupled to the processor. The memory may be configured to store processor-executable instructions. The processor-executable instructions, on execution, may cause the processor to register a containerized server in a framework, upon a request from a server developer. The processor instructions may further cause the processor to create a docker image from within the IDE upon a first request from an end user. In accordance with an embodiment, the docker image may include metadata corresponding to a project. In accordance with an embodiment, the metadata may include a project runtime ID and a list of exposed ports. The processor instructions further cause the processor to create a docker container from within the IDE upon a second request from the end user, using the docker image and based on the metadata. The processor instructions may further cause the processor to automatically create and upon creating the docker container, an instance of the containerized server within the IDE by executing a wrapper class corresponding to the project runtime ID and to the containerized server. In accordance with an embodiment, the containerized server may correspond to the docker container. In accordance with an embodiment, the wrapper class may be executed by the framework.

In accordance with yet another embodiment, a non-transitory computer-readable storage medium of automatically creating an instance of a containerized server within an IDE is disclosed. The non-transitory computer-readable storage medium has computer-executable instructions stored thereon. The computer-executable instructions may cause a computer comprising one or more processors to perform operations including registering a containerized server in a framework, upon a request from a server developer. The operations further include creating a docker image from within the IDE upon a first request from an end user. In accordance with an embodiment, the docker image may include metadata corresponding to a project. In accordance with an embodiment, the metadata may include a project runtime ID and a list of exposed ports. The operations may further include creating a docker container from within the IDE upon a second request from the end user, using the docker image and based on the metadata. The operations may further include automatically creating and upon creating the docker container, an instance of the containerized server within the IDE by executing a wrapper class corresponding to the project runtime ID and to the containerized server. In accordance with an embodiment, the containerized server may correspond to the docker container. In accordance with an embodiment, the wrapper class may be executed by the framework.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

The following described implementations may be found in the disclosed method and system for automatically creating an instance of a containerized server within an IDE when a new docker container is created allowing server developer(s) to deploy code to a server. The disclosed system (referred as processing system) may improve user experience by delegating server creation process to a server developer. Exemplary aspects of the disclosure may provide a framework that allows the server developer to automatically create an instance of the server when a docker container is created. The disclosed method for automatically creating the instance of the containerized server within the IDE may be completely transparent to an end-user (such as, a software developer or a vendor).

The disclosed system facilitates on saving time for investigation of how to create an instance of the containerized server for each of different docker containers. Consequently, the disclosed system may facilitate avoiding of human errors due the lack of knowledge of server configuration stored in the docker container. Therefore, exemplary aspects of the disclosure may, using a docker container in a development environment, create a ready to go solution where once the docker container is created, the end user can start using the instance of that docker container. The disclosed system helps in reduction of development time by integrating pre-registered server and thereby facilitating modular software development. As a result, end users, such as, programmers or software developers may concentrate on developing application logic rather than wiring components together and implementing commonly required or low-level functionality.

Figure 1A:
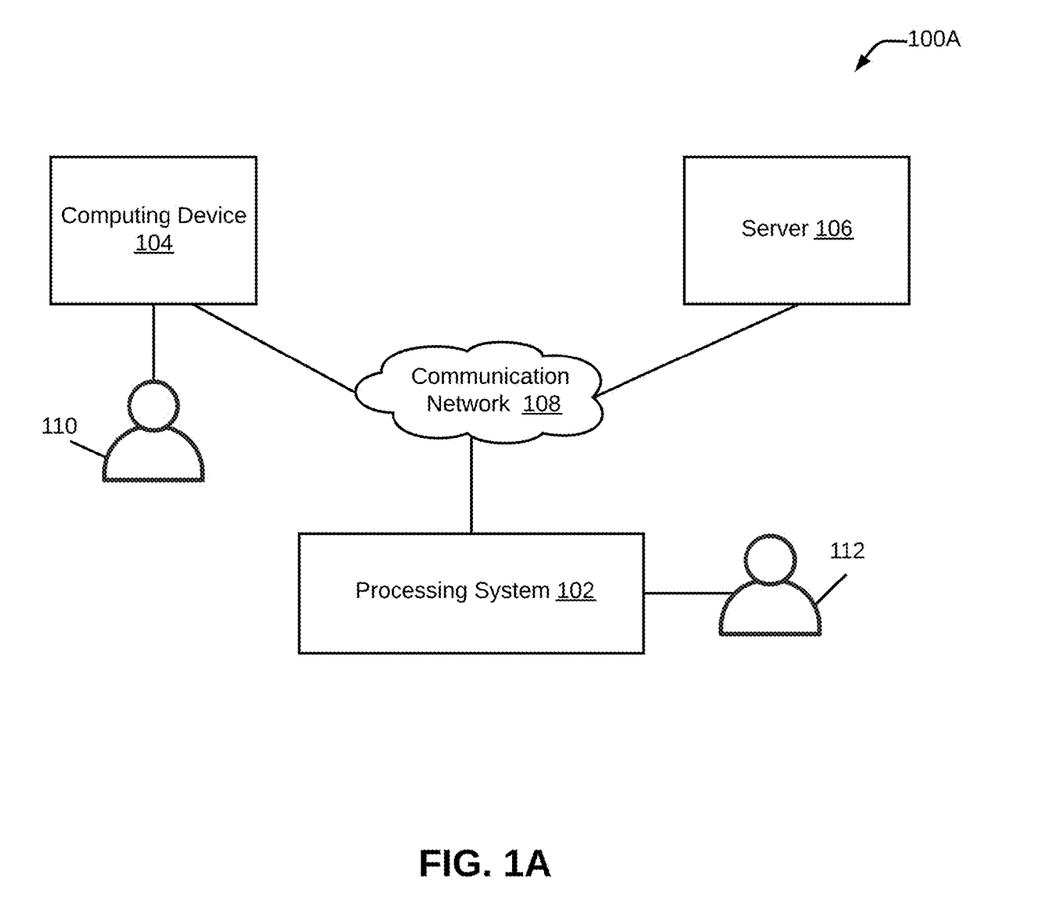
FIG. 1A is a block diagram that illustrates an environment for a processing system of automatically creating an instance of a containerized server within an Integrated Development Environment (IDE), in accordance with an embodiment of the disclosure.

FIG. 1A is a block diagram that illustrates an environment for a processing system of automatically creating an instance of a containerized server within an Integrated Development Environment (IDE), in accordance with an embodiment of the disclosure.

The environment 100 includes a processing system 102, a computing device 104, a server 106, and a communication network 108. There is further shown a server developer 110 associated with the computing device 104 and an end user 112 associated with the processing device 102. The processing system 102 may be communicatively coupled to the computing device 104 and the server 106, via the communication network 108.

The processing system 102 may include suitable logic, circuitry, interfaces, and/or code that may be configured to implement a framework for automatically creating an instance of a containerized server within the IDE. In accordance with an embodiment, the processing system 102 may correspond to a service provider for providing automatic creation of instances of containerized servers within the IDE. In accordance with an embodiment, the processing system 102 may host a web server. The framework may include programs to interact with the web server. The framework may also include a library that stores commands for communicating with an interface (e.g., an API) of the web server.

The processing system 102 may be configured to manage docker containers. The processing system 102 may provide one or more services, such as docker container instance service, to the end user 112. The end user 112 may be a customer or a software vendor of the processing system 102. In accordance with an embodiment, the processing system 102 may host container instances for the end user 112.

The one or more services may be configured to provide the end user 112, the access to resources of the processing system 102. The resources of the processing system 102 may include data processing, data storage, applications, interfaces, permissions, security policies, encryption, and/or other such services. For example, a docker container instance service may be provided by the processing system 102 to the end user 112 by automatically creating an instance of a containerized server within the IDE.

The processing system 102 may facilitate automatic creation of server instances to save time and to avoid human errors due the lack of knowledge of server configuration stored in the docker container on part of end users, thereby improving user experience in terms of efficiency, accuracy, and usability. The processing system 102 may facilitate instantiation of docker containers on behalf of an end user, such as, the end user 112.

By way of example, the processing system 102 may be implemented as a plurality of distributed cloud-based resources by use of several technologies that are well known to those skilled in the art. Other examples of implementation of the processing system 102 may include, but are not limited to, a laptop, a web/cloud server, an application server, a media server, and a Consumer Electronic (CE) device.

The computing device 104 may include suitable logic, circuitry, interfaces, and/or code that may be configured to store, maintain, and execute one or more software platforms and programs. The computing device 104 may be configured to request the processing system 102 to instantiate registry of a containerized server on behalf of the server developer 110. The registry of the docker container as a service may be a set of APIs and endpoints that are made accessible for the processing system 102. In accordance with an embodiment, the computing device 104 may be hosted and operated by the processing system 102.

In accordance with an embodiment, the computing device 104 may be configured to access one or more services of the processing system 102. The computing device 104 may store data or retrieve data associated with the registry of the containerized server. The computing device 104 may be configured to receive secured and/or protected access to the one or more services of the processing system 102 via encryption keys, thereby enabling secure and/or protected access between the computing device 104 and the processing system 102. The computing device 104 may be used in an application server environment for server programming by the server developer 110. The functionalities of the computing device 104 may be implemented in portable devices, such as a high-speed computing device, and/or non-portable devices, such as, a server.

Although in FIG. 1, the processing system 102 and the computing device 104 are shown as two separate entities, this disclosure is not so limited. Accordingly, in some embodiments, the entire functionality of the computing device 104 may be included in the processing system 102, without a deviation from scope of the disclosure.

The end user 112 may interact with the processing system 102 to operate the docker container for which the containerized server is registered by the server developer 110 on the computing device 104 hosted and operated by the processing system 102. The docker container may be used for several purposes, such as, but not limited to, supporting a website or database applications, to execute business or electronic commerce applications, or, generally, to serve as compute power for the end user 112.

The server 106 may be implemented in various ways, such as hardware devices or virtual computer systems. In some contexts, servers may refer to a programming module being executed on a computer system. In accordance with an embodiment, the server 106 may correspond to a web server that can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from client devices, such as by executing one or more web applications that may be implemented as one or more scripts or programs written in any programming language. The server(s) may also include database servers, including those commercially available, and any other server capable of storing, retrieving, and accessing structured or unstructured data. The server 106 may include an application server to provide static, dynamic or a combination of static and dynamic data in response to received instructions.

The server 106 may typically include an operating system that provides executable program instructions for the general administration and operation of that server and typically will include a computer-readable storage medium (e.g., a hard disk, random access memory, read only memory, etc.) storing instructions that, as a result of execution by a processor of the server, allow the server to perform its intended functions.

The communication network 108 may include a communication medium through which the processing system 102, the computing device 104, and the server 106 may communicate with each other. The communication network 108 may be a distributed system of servers deployed in multiple geographic regions in around the world, communicating with each other via a network, such as the Internet. The communication network 108 may host content (e.g., docker images) on the servers throughout the various geographic regions by copying the content from a server in one geographic region to a server in another geographic region.

Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment 100 may be configured to connect to the communication network 108, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

During operation, the end user 112 may request the framework implemented on the processing system 102 to automatically create an instance of a containerized server within the IDE. In response to the end user 112 making the request, the processing system 102 may make a programming interface request to a registry of the docker container.

The processing system 102 may be configured to register the containerized server in a framework, upon a request from the server developer 110 using the computing device 104, via the communication network 108. In accordance with an embodiment, data associated with the registry of the containerized server may be stored in the server 106. In an embodiment, an extension point may be implemented within the framework to register the containerized server. The extension point may be used by the server developer 110 in a plug-in unit to register a new server (or the containerized server). Alternatively, the processing system 102 may be configured to upload a docker image to a docker hub using metadata for registering the containerized server.

The processing system 102 may be further configured to create the docker image from within the IDE upon a first request (API request) from the end user 112. In accordance with an embodiment, the docker image may include metadata corresponding to a project. In accordance with an embodiment, the metadata may include a project runtime ID and a list of exposed ports. The processing system 102 may be configured to create a docker container from within the IDE upon a second request from the end user, using the docker image and based on the metadata.

The processing system 102 may be configured to automatically create and upon creating the docker container, an instance of the containerized server within the IDE by executing a wrapper class corresponding to the project runtime ID and to the containerized server. In accordance with an embodiment, the containerized server may correspond to the docker container. In accordance with an embodiment, the wrapper class may be executed by the framework.

As will be appreciated, although a web-based environment is used for purposes of explanation, different environments may be used, as appropriate, to implement various embodiments. The environment may include one or more client devices which can include any appropriate device operable to send and/or receive requests, messages or information over an appropriate communication network and, in some embodiments, convey information back to a user of a client device. Examples of such client devices include personal computers, cell phones, handheld messaging devices, laptop computers, tablet computers, set-top boxes, personal data assistants, embedded computer systems, and electronic book readers.

Figure 1B:
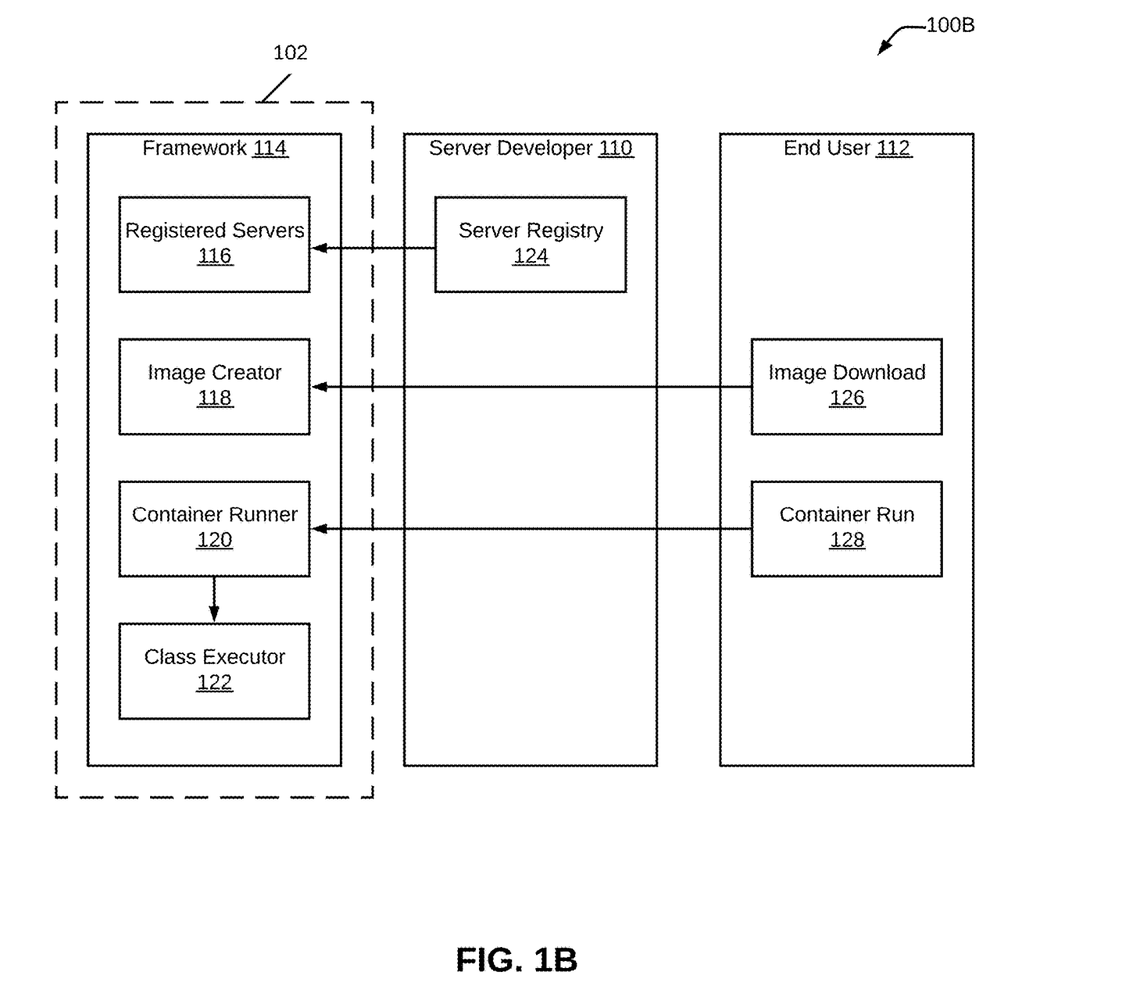
FIG. 1B is an architectural block diagram that illustrates an environment for a processing system of automatically creating an instance of a containerized server within an IDE, in accordance with an embodiment of the disclosure.

FIG. 1B is an architectural block diagram 100B that illustrates an environment for a processing system of automatically creating an instance of a containerized server within an IDE, in accordance with an embodiment of the disclosure. FIG. 1B is explained in conjunction with FIG. 1A.

With reference to FIG. 1B, there is shown a framework 114, registered servers 116, image creator 118, a container runner 120, a class executor 122, a server registry 124, an image download 126, and a container run 128.

In accordance with an embodiment, the processing system 102 may use a docker that corresponds to an open platform for developing, shipping, and running applications by using docker containers allowing them to be portable to any system running on a Linux or Windows Operating System (OS). In accordance with an embodiment, the docker containers may allow a software developer to package up an application with all the parts it needs, such as, libraries and other dependencies, and deploy it as one package. The docker containers may provide isolation and security which allow the end user 112 to run many docker containers simultaneously on a given host, and will not need extra load of a hypervisor but run directly within a host machine's kernel. As a result, more docker containers can be run on a given hardware combination than using virtual machines.

In accordance with an embodiment, an extension point of an IDE may be used to register containerized servers. The extension point may be used by the server developers, such as the server developer 110, in a plug-in unit of the IDE to register new servers as a server registry 124. In accordance with another embodiment, the docker image may be uploaded to a docker hub using metadata. The docker hub may correspond to a hosted repository provided by the docker. The docker containers may be very useful for continuous integration and continuous delivery workflows making it part of many DevOps toolchains. In accordance with an embodiment, container images may be found and shared by using the docker hub. After the server registry 124, the framework in the processing system 102 may have registered servers 116.

In accordance with an embodiment, to use the docker, then images, containers, networks, volumes, plugins and other objects may be created and used. In accordance with an embodiment, a docker image may be created (referred as image creator 116) by running a docker file. The docker image may correspond to a read-only template with instructions for creating a docker container. In certain scenarios, the docker image may be based on another docker image, with some additional customization. The docker image may be one or more software applications corresponding to a software package. One or more base layers of the docker image may comprise the operating system used to execute other software applications.

In accordance with an embodiment, the processing system 102 may be configured to receive the first request from the end user 112, using a first shortcut in the IDE, for creating the docker image. To create the docker image, the processing system 102 may be configured to create a docker file with a simple syntax for defining the steps that are needed to create the docker image and run it. In accordance with an embodiment, the docker file may include metadata corresponding to a project associated with the end user 112. Each instruction in the docker file may create a layer in the docker image. In accordance with an embodiment, the docker file may be changed and the docker image maybe rebuilt. In such a case, only the layers that have changed may be rebuilt.

In accordance with an embodiment, the processing system 102 may be configured to read project properties where the docker file is located to find a target runtime for the project (hereinafter referred as project runtime). In accordance with an embodiment, the processing system 102 may be configured to execute "docker build" command and add the project runtime as the metadata for the docker image (referred as image creator 118). In accordance with an embodiment, the full command may be shown below:

"docker build-label<metadata_id>=<project_runtime>"

In accordance with another embodiment, the docker image may be downloaded from the docker hub. In accordance with an embodiment, the end user 112 may have a private repository in the processing system 102 to upload docker images under development that are not ready for a release, and a public repository to upload docker images that may be purchased and/or downloaded for installation by various users. In accordance with an embodiment, the repositories may be individual databases or may be stored in one or more data stores of the server 106.

After the image creator 118 with the metadata, a docker container may be created based on the docker image created. In accordance with another embodiment, the docker images may be physically located on servers, such as the server 106 in different geographic regions to provide faster uploading and downloading of docker images.

In accordance with an embodiment, the processing system 102 may be configured to receive the second request from the end user, using a second shortcut in the IDE, for creating the docker container.

In accordance with an embodiment, the processing system 102 may be configured to read the project runtime value stored as metadata in the docker image using the "docker inspect <image_id>" command. In accordance with an embodiment, the processing system 102 may be configured to read a list of exposed ports stored as metadata in the docker image using the "docker inspect <image_id>" command.

In accordance with an embodiment, the processing system 102 may be configured to execute the "docker run" command to create the docker container (referred as the container runner 120 that uses the metadata). In accordance with an embodiment, the full docker run command may be:

"docker run <image_id >-detach-publish <host_port>:<guest_port>"

In accordance with an embodiment, when a new docker container is created using the second shortcut in the IDE, the processing system 102 may be configured to execute a corresponding wrapper class (or Java class) automatically based on a project runtime Identity (ID). In accordance with an embodiment, the processing system 102 may be configured to execute the corresponding wrapper class (referred as class executor 122), based on a match between the project runtime ID in the docker image with the containerized server. In other words, since the project runtime is known, a contribution from the registered servers 116 may be found that matches the runtime id. When a contribution is found, the framework 114 may execute the class provided for that runtime. Therefore, the server developer 110 can execute necessary code to automatically create a new server instance within the IDE that points to the server running inside the docker container.

In accordance with an embodiment, the new server instance may be referred to as a docker container instance or a computer system instance (virtual or non-virtual, such as a physical computer system running an operating system) that is configured to launch and run the docker container. Such new server instance may be configured to run the docker container in accordance with a predefined task in a definition file provided by the end user 112. In accordance with an embodiment, the processing system 102 may be configured to run a plurality of docker containers on OS of the server instances and execute in isolation from each other. Therefore, the processing system 102 may be configured to automatically create a server instance in the IDE when a new docker container is created allowing server developers to deploy code to the server.

Figure 1C:
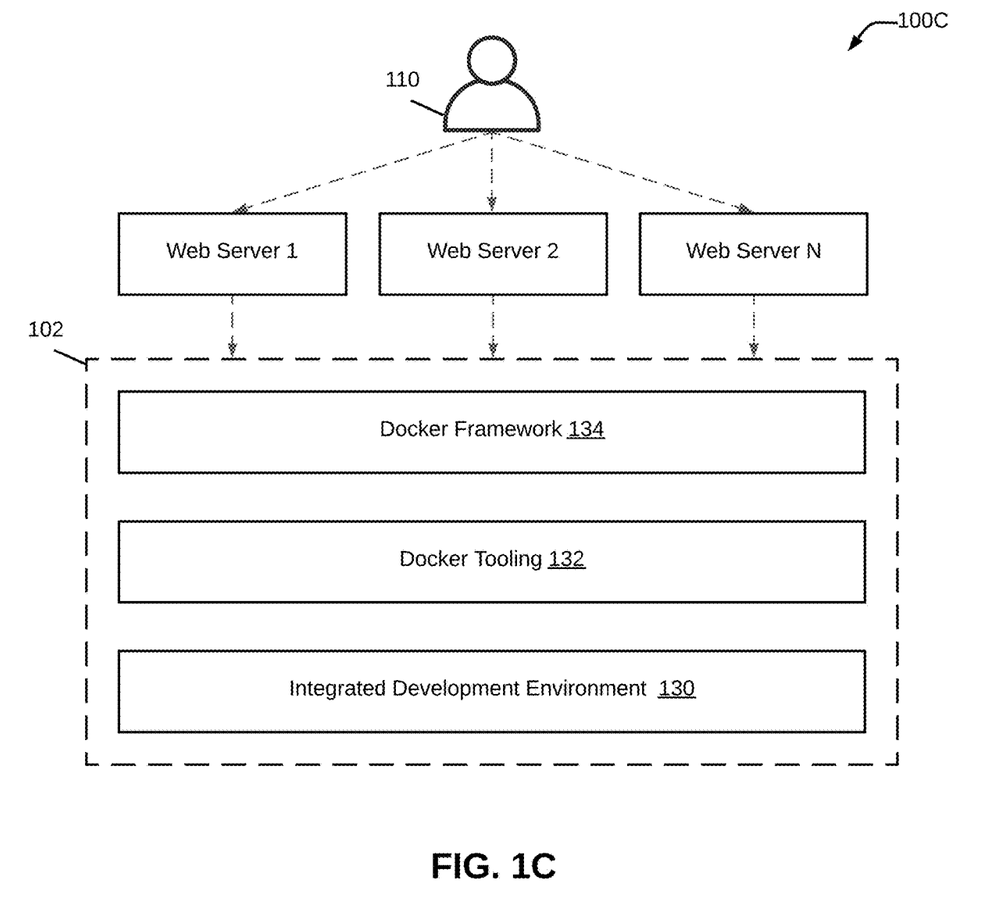
FIG. 1C is a block diagram that illustrates an implementation provided by server developer(s) for automatically creating an instance of a containerized server within an IDE, in accordance with an embodiment of the disclosure.

FIG. 1C is a block diagram that illustrates an implementation provided by server developers for automatically creating an instance of a containerized server within an IDE, in accordance with an embodiment of the disclosure. FIG. 1C is explained in conjunction with FIG. 1A-FIG. 1B.

With reference to FIG. 1C, there is shown an IDE 130, a docker tooling 132, a docker framework 134, a plurality of web servers, viz., web server 1, web server 2, . . . , web server N.

In accordance with an embodiment, the IDE 130 within the processing system 102 may be used to create a software and can be used for a variety of other application development in many languages. The IDE 130 may include a main workspace environment with a rich set of built-in features/plugins and can be easily extended by providing additional installable plugins.

The docker tooling 132 corresponds to a plugin that provides the ability to manage the docker images and the docker containers from within the IDE 130. The docker framework 134 may include a component docker container that provides a set of services, application programming interfaces (APIs), and protocols that facilitate modular software development. The docker container may also provide runtime support, such as lifecycle management, frameworks (such as the docker framework 134), deployment services, automatic threading, transaction management, and other services.

In accordance with an embodiment, one or more of the plurality of web servers, viz., web server 1, web server 2, . . . , web server N may be used as application servers for implementation of server registry by server developers, such as, the server developer 110. Examples of the web servers may include, without limitation, GlassFish, Node-Red and Liberty. The disclosed system described herein is not intended to be limited to these web servers. In recognition that particular standards evolve and that alternatives become available, it is intended that the embodiments described herein be applicable to any application server.

The plurality of web servers, viz., web server 1, web server 2, . . . , web server N are containerized. In accordance with an embodiment, when an end user, such as, the end user 112 may try to use one of the plurality of web servers, viz., web server 1, web server 2, . . . , web server N to develop applications in the IDE 130, the end user 112 need not create a server connection that points to the server inside the docker container. The docker tooling 132 may have an additional installable plug-in that supports management of the docker images and the docker containers from within the IDE 130 The docker tooling 132 may have a plug-in unit to register new containerized servers from the server developer 110 in the docker framework 134. In accordance with an embodiment, the docker framework 134 may allow the server developer 110 to automatically create an instance of the containerized server when a docker container is created.

Figure 2:
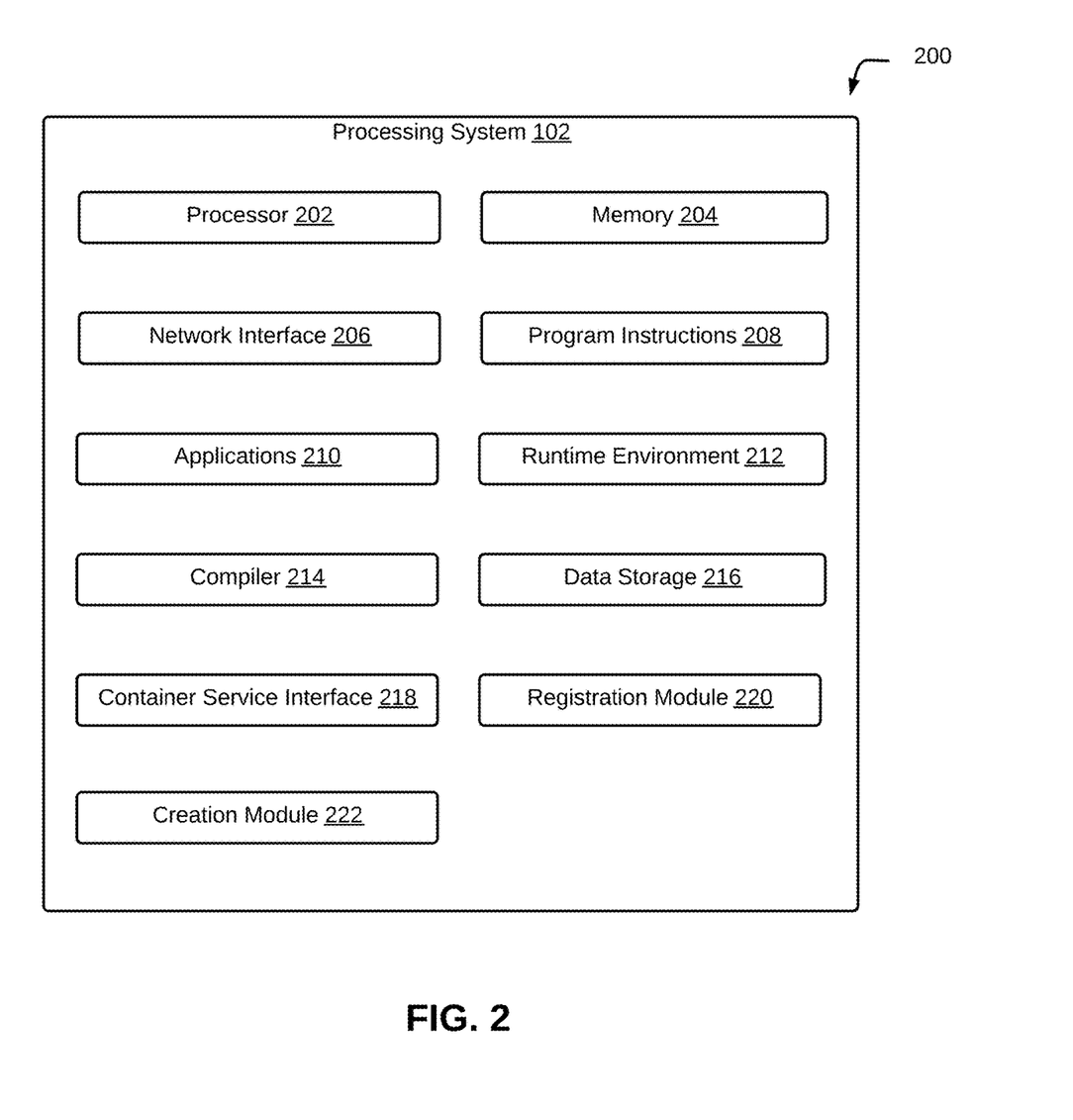
FIG. 2 is a functional block diagram of a processing system for automatically creating an instance of a containerized server within an IDE, in accordance with an embodiment.

FIG. 2 is a functional block diagram of a processing system for automatically creating an instance of a containerized server within an IDE, in accordance with an embodiment. FIG. 2 is explained in conjunction with FIG. 1A-FIG. 1C.

With reference to FIG. 2, there is shown a processor 202, a memory 204, a network interface 206, program instructions 208, applications 210, runtime environment 212, complier 214, data storage 216, a docker container instance service interface 218, a registration module 220, and a creation module 222.

In accordance with an embodiment, computer-executable instructions may include, for example, instructions and data configured to cause the processor 202 to perform a certain operation or a set of operations associated with the processing system 102. The functions or operations executed by the processing system 102, as described in FIG. 1A-1C, may be performed by the processor 202. In accordance with an embodiment, additionally, or alternatively, the operations of the processor 202 are performed by various modules, namely, the registration module 220, and the creation module 222.

The memory 204 may include suitable logic, circuitry, and/or interfaces that may be configured to store instructions executable by the processor 202. Additionally, the memory 204 may be configured to store program code of software applications. The memory 204 may be configured to store any received data or generated data associated with storing, maintaining, and executing the processing system 102 used for automatically creating an instance of a containerized server within the IDE. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may include suitable logic, circuitry, interfaces, and/or code that may be configured to facilitate different components of the processing system 102 to communicate with other devices, such as the server 106, and the computing device 104 in the environment 100, via the communication network 108. The network interface 206 may be configured to implement known technologies to support wired or wireless communication. Components of the network interface 206 may include, but are not limited to an antenna, a radio frequency (RF) transceiver, one or more amplifiers, a tuner, one or more oscillators, a digital signal processor, a coder-decoder (CODEC) chipset, an identity module, and/or a local buffer.

The network interface 206 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The program instructions 208 may be encoded in platform native binary, any interpreted language, in any high-level programming language. The program instructions 208 may include instructions executable to implement various applications 210, such as web applications, and/or application components of the processing system 102. The program instructions 208 may include instructions executable to implement the compiler 214, which may be usable to compile source code representations of programs and/or components into an executable form. In accordance with an embodiment, the program instructions 208 may also include one or more runtime environments 212. The runtime environments 212 may include a Java™ runtime, or various runtime support mechanisms.

The data storage 216 may include suitable logic, circuitry, and/or interfaces that may be configured to store program instructions executable by the processor 202, the registration module 220, the creation module 222, operating systems, and/or application-specific information, such as logs and application-specific databases. The data storage 216 may include a computer-readable storage media for carrying or having computer-executable instructions or data structures stored thereon. Such computer-readable storage media may include any available media that may be accessed by a general-purpose or special-purpose computer, such as the processor 202, the registration module 220, and the creation module 222. The data storage 216 may generally be stored in the memory 204.

In accordance with an embodiment, the data storage 216 may include an application persistency which stores a plurality of application events that occur internally during an execution of a software application. In accordance with an embodiment, the data storage 216 may store data for instantiating new server instances for docker containers. The data storage 216 may be used to store the docker images. Similarly, any necessary files for performing the functions attributed to the computers, servers or other network devices may be stored in the data storage 216.

By way of example, and not limitation, the data storage 216 may use computer-readable storage media that includes tangible or non-transitory computer-readable storage media including, but not limited to, Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

In some embodiments, the docker container instance service interface 218 may correspond to an interface that enable the end user 112 to submit requests for one or more services (such as, to create a new server instance for a docker container) of the processing system 102. In accordance with an embodiment, the docker container instance service interface 218, such as a command line interface (CLI), may be used through which the end user 112 or other authorized entity may communicate with docker containers of the processing system 102. In some embodiments, the docker container instance service interface 218 may be executed on a local computer system by an end user, such as the end user 112.

The registration module 220 may include suitable logic, circuitry, and/or interfaces that may be configured to register a containerized server in a framework, upon a request from the server developer 110. In accordance with an embodiment, registering the containerized server comprises one of registering the containerized server using an extension point of the IDE or uploading the docker image to a docker hub using the metadata.

The creation module 222 may include suitable logic, circuitry, and/or interfaces that may be configured to create a docker image from within the IDE upon a first request from an end user. The creation module 222 may be configured to create a docker container from within the IDE upon a second request from the end user, using the docker image and based on the metadata. The creation module 222 may be configured to automatically create and upon creating the docker container, an instance of the containerized server within the IDE by executing a wrapper class corresponding to the project runtime ID and to the containerized server. In accordance with an embodiment, the containerized server corresponds to the docker container. In accordance with an embodiment, the wrapper class is executed by the framework.

As used herein, the term module refers to an application specific integrated circuit (ASIC), an electronic circuit, a field programmable gate arrays (FPGA), Programmable System-on-Chip (PSoC), a combinational logic circuit, and/or other suitable components that provide the described functionality. The registration module 220 and the creation module 222 when configured with the functionality defined in the present disclosure will result in a novel hardware.

Figure 3A:
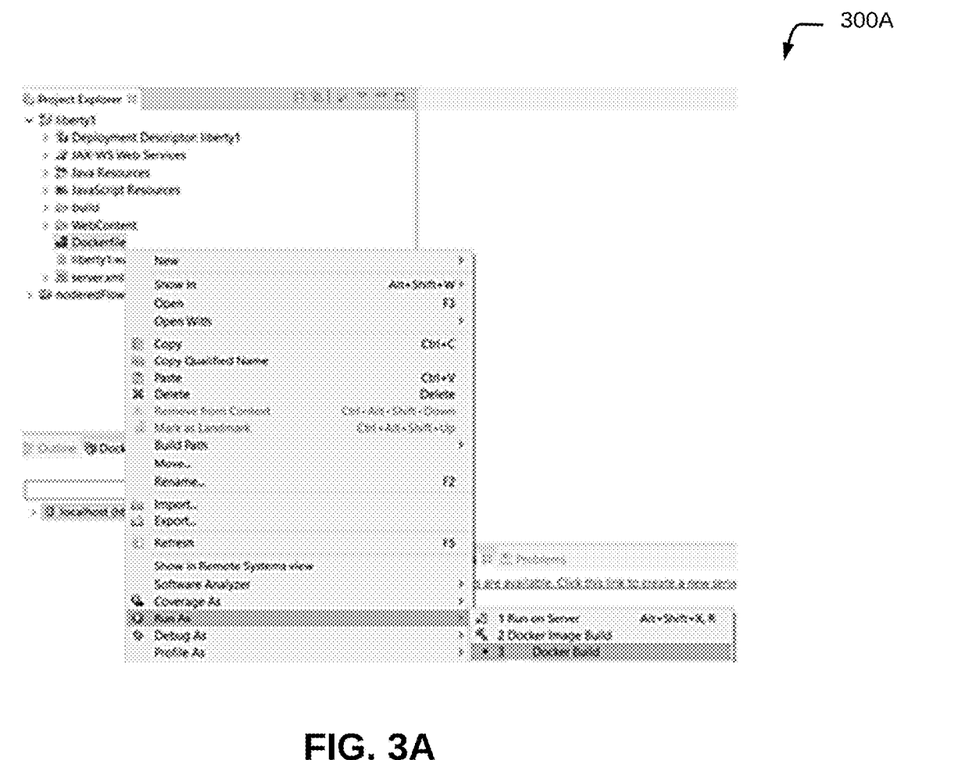
FIG. 3A illustrates an exemplary scenario for creating a shortcut in an IDE to create a docker image, in accordance with an embodiment of the disclosure.

FIG. 3A illustrates an exemplary scenario 300A for creating a shortcut in an IDE to create a docker image, in accordance with an embodiment of the disclosure. FIG. 3A is explained in conjunction with FIG. 1A-FIG. 2.

In accordance with an embodiment, the creation module 222 of the processing system 102 may be configured to receive a first request from the end user 112, using a first shortcut in the IDE, for creating the docker image ("Docker Build").

In an embodiment, the first shortcut to create the docker image may be based on the "Dockerfile" that may read the project metadata to find runtime id and add the same to the docker image as metadata. As illustrated in FIG. 3A, the creation module 222 of the processing system 102 may be configured to execute the docker file ("Run As"). In accordance with an embodiment, the docker file may include the metadata corresponding to the project associated with the end user 112.

Figure 3B:
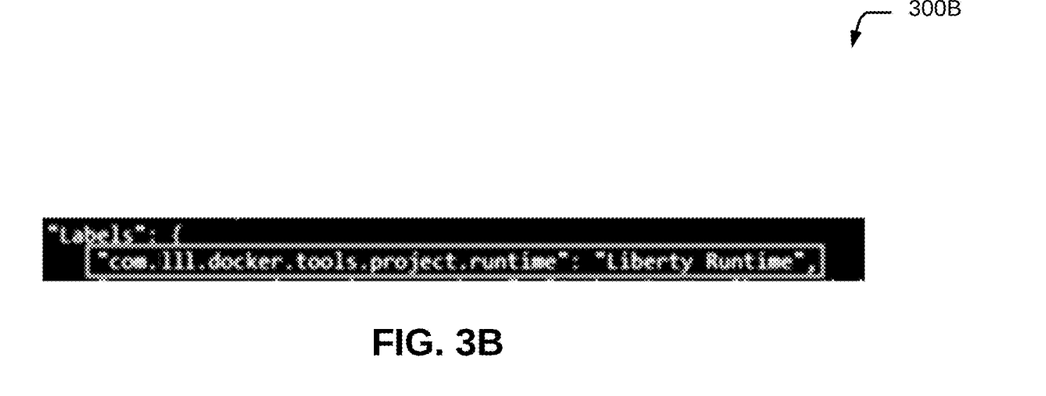
FIG. 3B is a pictorial representation that illustrates adding metadata to a docker image in an IDE, in accordance with an embodiment of the disclosure.

FIG. 3B is a pictorial representation 300B that illustrates metadata addition to a docker image, in accordance with an embodiment of the disclosure. FIG. 3B is explained in conjunction with FIG. 1A-FIG. 3A.

In accordance with an embodiment, the docker file that may read the project metadata to find runtime id and add the same to the docker image as metadata (as described for FIG. 3A). The metadata added to the docker image may include a key-value pair containing the runtime id ("Liberty Runtime") as illustrated in FIG. 3B.

Figure 4A:
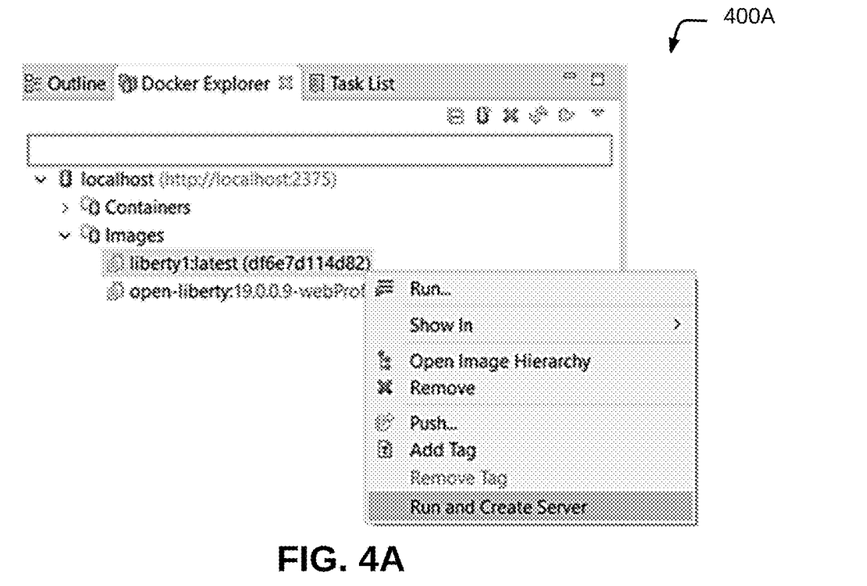
FIG. 4A illustrates an exemplary scenario for creating a shortcut in an IDE to create a docker container, in accordance with an embodiment of the disclosure.

FIG. 4A illustrates an exemplary scenario 400A for creating a shortcut in an IDE to create a docker container, in accordance with an embodiment of the disclosure. FIG. 4A is explained in conjunction with FIG. 1A-FIG. 3B.

In accordance with an embodiment, the creation module 222 of the processing system 102 may be configured to receive a second request from the end user 112, using a second shortcut in the IDE, for creating the docker container ("Run and Create Server"). In accordance with an embodiment, the second shortcut to create the docker container (also referred as docker runtime) may be based on the docker image created before (as illustrated in FIG. 3A), which may read the metadata from the docker image and execute the corresponding class for that particular server.

Figure 4B:
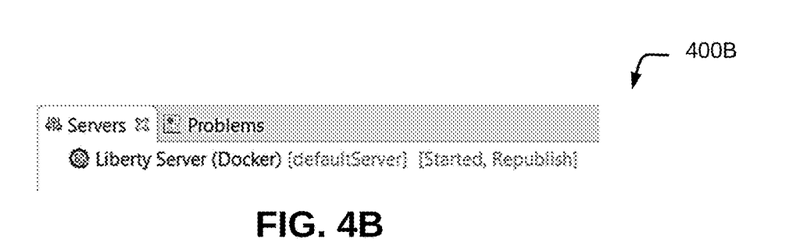
FIG. 4B is a pictorial representation that illustrates creation of an instance of a containerized server within an IDE, in accordance with an embodiment of the disclosure.

FIG. 4B is a pictorial representation 400B that illustrates creation of an instance of a containerized server within an IDE, in accordance with an embodiment of the disclosure. FIG. 4B is explained in conjunction with FIG. 1A-FIG. 4A.

In accordance with an embodiment, the creation module 222 of the processing system 102 may be configured to automatically create and upon creating the docker container, an instance of the containerized server within the IDE ("Liberty Server Docker") as illustrated in FIG. 4B, by executing a wrapper class corresponding to the project runtime ID and to the containerized server. In accordance with an embodiment, the containerized server may correspond to the docker container. In accordance with an embodiment, the wrapper class may be executed by the framework. In accordance with an embodiment, the execution of the corresponding wrapper class may be based on a match between the project runtime ID in the docker image with the containerized server.

Figure 4C:
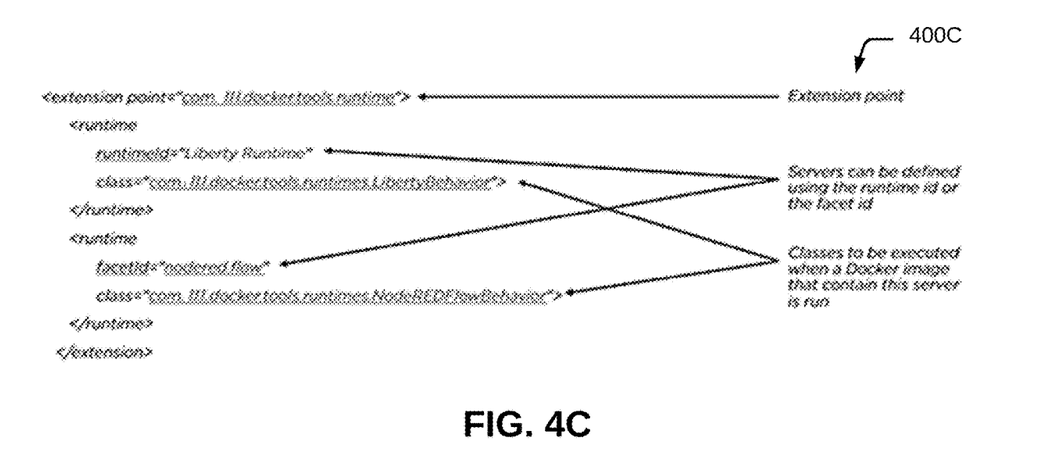
FIG. 4C illustrates an exemplary scenario for an implementation of an extension point of an IDE used by server developer(s) to provide implementations for two servers, in accordance with an embodiment of the disclosure.

FIG. 4C illustrates an exemplary scenario for an implementation of an extension point of an IDE used by server developers to provide implementations for two servers, in accordance with an embodiment of the disclosure. FIG. 4C is explained in conjunction with FIG. 1A-FIG. 4B.

In accordance with an embodiment, an implementation of an extension point used by the server developers, such as, the server developer 110 to provide implementations for two web servers, Open Liberty and Node-RED is illustrated in FIG. 4C. The extension point may correspond to a formal declaration in a plugin.xml file where customization is allowed. In accordance with an embodiment, the containerized server may be defined using a run time id (such as, Liberty Runtime) or a facet id (such as, nodered flow). In accordance with an embodiment, the processing system 102 may be configured to execute a wrapper class corresponding to the project runtime ID and to the containerized server. For example, class="com.lll, docker.tools.runtimes.LibertyBehavior" and class="com.lll, docker.tools.runtimes.NodeRedFlowBehavior".

Figure 5:
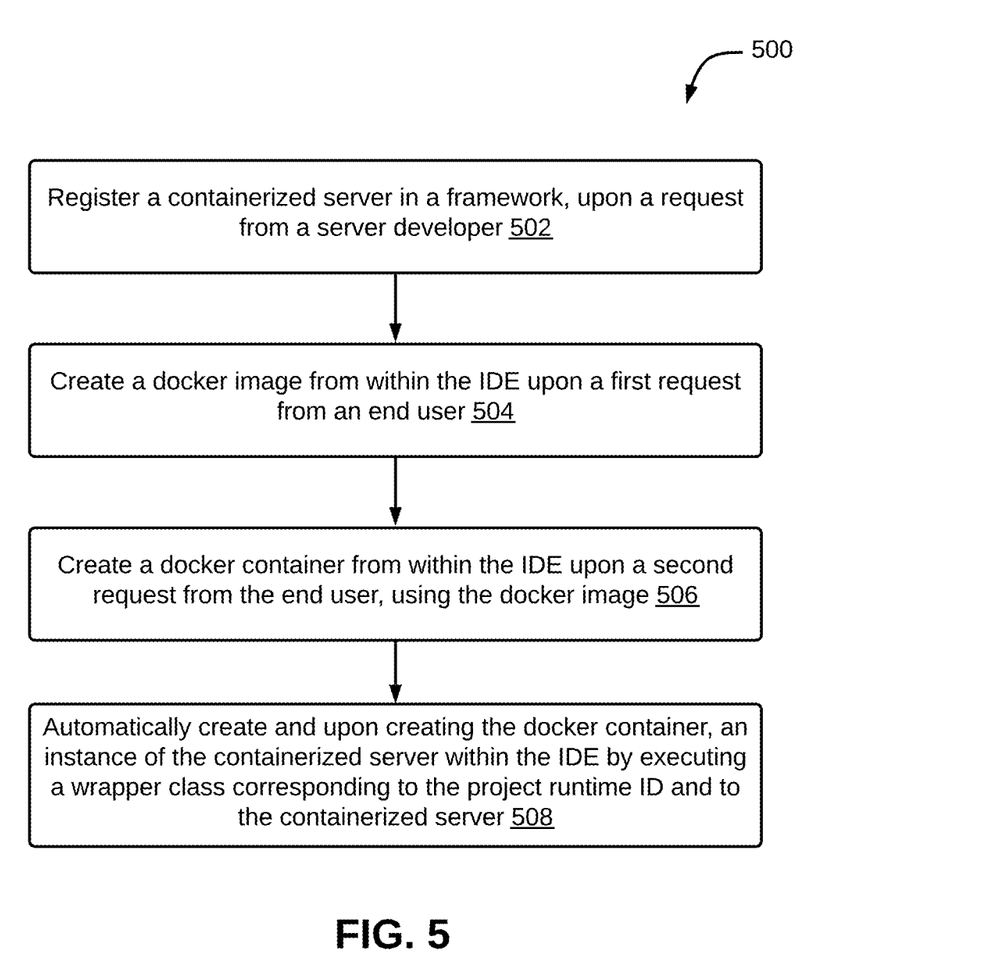
FIG. 5 is a flowchart that illustrates an exemplary method for automatically creating an instance of a containerized server within an IDE, in accordance with an embodiment of the disclosure.

FIG. 5 is a flowchart that illustrates an exemplary method for automatically creating an instance of a containerized server within an IDE. With reference to FIG. 5, there is shown a flowchart 500. The operations of the exemplary method may be executed by any computing system, for example, by the processing system 102 of FIG. 1A. The operations of the flowchart 500 may start at 502 and proceed to 504.

At 502, a containerized server may be registered in a framework, upon a request from a server developer. In accordance with an embodiment, the registration module of the registration module 220 of the processing system 102 may be configured to register the containerized server in a framework, upon the request from the server developer 110. In accordance with an embodiment, the containerized server may be registered using an extension point of the IDE. In accordance with another embodiment, the docker image may be uploaded to the docker hub using the metadata for registering the containerized server.

At 504, a docker image may be created from within the IDE upon a first request from an end user. In accordance with an embodiment, the creation module 222 of the processing system 102 may be configured to create the docker image from within the IDE upon the first request from the end user. In accordance with an embodiment, the docker image may include metadata corresponding to a project. In accordance with an embodiment, the metadata may include a project runtime ID and a list of exposed ports.

In accordance with an embodiment, the first request may be received from the end user, using a first shortcut in the IDE, for creating the docker image. In accordance with an embodiment, creating the docker image may include one of executing a docker file or downloading the docker image from the docker hub. In accordance with an embodiment, the docker file may include the metadata corresponding to the project.

At 506, a docker container may be created from within the IDE upon a second request from the end user, using the docker image and based on the metadata. In accordance with an embodiment, the creation module 222 of the processing system 102 may be configured to create the docker container from within the IDE upon the second request from the end user, using the docker image and based on the metadata. In accordance with an embodiment, the second request may be received from the end user, using a second shortcut in the IDE, for creating the docker container.

At 508, an instance of the containerized server may be automatically created upon creating the docker container, within the IDE by executing a wrapper class corresponding to the project runtime ID and to the containerized server. In accordance with an embodiment, the creation module 222 of the processing system 102 may be configured to automatically create and upon creating the docker container, the instance of the containerized server within the IDE by executing the wrapper class corresponding to the project runtime ID and to the containerized server.

In accordance with an embodiment, the containerized server may correspond to the docker container. In accordance with an embodiment, the wrapper class may be executed by the framework. In accordance with an embodiment, the execution of the corresponding wrapper class may be based on a match between the project runtime ID in the docker image with the containerized server.

In various embodiments, different portions of method 500 may be performed by different components of the processing system 102 and/or by other libraries. Generally, computer executable instructions can include routines, programs, objects, components, data structures, procedures, modules, and functions, which perform particular functions or implement particular abstract data types. The order in which the method 500 is described is not intended to be construed as a limitation, and any number of the described method blocks can be combined in any order to implement the method. Additionally, individual blocks may be deleted from the methods without departing from the spirit and scope of the subject matter described herein. Furthermore, the method 500 can be implemented in any suitable hardware, software, firmware, or combination thereof.

The following described implementations may be found in the disclosed method and system for automatically creating an instance of a containerized server within an IDE. The disclosed system (referred as processing system) may improve user experience by delegating server creation process to a developer of a server (hereinafter referred as server developer). Exemplary aspects of the disclosure may provide a framework that allows the server developer to automatically create an instance of the server when a docker container is created. The disclosed method for automatically creating the instance of the containerized server within the IDE may be completely transparent to an end-user (such as, a software developer).

The disclosed system facilitates on saving time on investigation of how to create an instance of the containerized server for each of different docker containers. Consequently, the disclosed system may facilitate avoiding of human errors due the lack of knowledge of server configuration stored in the docker container. Therefore, exemplary aspects of the disclosure may, using a container in a development environment, create a ready to go solution where once the docker container is created, the end user can start using the instance of that docker container. The disclosed system helps in reduction of development time by integrating pre-registered server and thereby facilitating modular software development. As a result, end users, such as, programmers or software developers may concentrate on developing application logic rather than wiring components together and implementing commonly required or low-level functionality.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It will be appreciated that, for clarity purposes, the above description has described embodiments of the disclosure with reference to different functional units and processors. However, it will be apparent that any suitable distribution of functionality between different functional units, processors or domains may be used without detracting from the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present disclosure has been described in connection with some embodiments, it is not intended to be limited to the specific form set forth herein. Rather, the scope of the present disclosure is limited only by the claims. Additionally, although a feature may appear to be described in connection with particular embodiments, one skilled in the art would recognize that various features of the described embodiments may be combined in accordance with the disclosure.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous.

Also, the inclusion of a feature in one category of claims does not imply a limitation to this category, but rather the feature may be equally applicable to other claim categories, as appropriate.

What is claimed is:

1. A method of automatically creating an instance of a containerized server within an Integrated Development Environment (IDE), the method comprising:

registering, by a processing device, a containerized server in a framework, upon a request from a server developer;

creating, by the processing device, a docker image from within the IDE upon a first request from an end user, wherein the docker image comprises metadata corresponding to a project, and wherein the metadata comprises a project runtime ID and a list of exposed ports;

creating, by the processing device, a docker container from within the IDE upon a second request from the end user, using the docker image and based on the metadata; and automatically creating, by the processing device and upon creating the docker container, an instance of the containerized server within the IDE by executing by the framework a wrapper class corresponding to the project runtime ID and to the containerized server, wherein the containerized server is associated with the docker container, and wherein the execution of the corresponding wrapper class is based on a match between the project runtime ID in the docker image with the containerized server.

2. The method of claim 1, wherein registering the containerized server comprises one of:

registering the containerized server using an extension point of the IDE; or uploading the docker image to a docker hub using the metadata.

3. The method of claim 1, further comprising receiving the first request from the end user, using a first shortcut in the IDE, for creating the docker image.

4. The method of claim 1, wherein creating the docker image comprises one of:

executing a docker file, wherein the docker file comprises the metadata corresponding to the project, or downloading the docker image from a docker hub.

5. The method of claim 1, further comprising receiving the second request from the end user, using a second shortcut in the IDE, for creating the docker container.

6. A system for automatically creating an instance of a containerized server within an Integrated Development Environment (IDE), the system comprising:

a processor; and a memory communicatively coupled to the processor, wherein the memory stores processor-executable instructions, which, on execution, causes the processor to:

register a containerized server in a framework, upon a request from a server developer;

create a docker image from within the IDE upon a first request from an end user, wherein the docker image comprises metadata corresponding to a project, and wherein the metadata comprises a project runtime ID and a list of exposed ports;

create a docker container from within the IDE upon a second request from the end user, using the docker image and based on the metadata; and automatically create and upon creating the docker container, an instance of the containerized server within the IDE by executing by the framework a wrapper class corresponding to the project runtime ID and to the containerized server, wherein the containerized server is associated with the docker container, and wherein the execution of the corresponding wrapper class is based on a match between the project runtime ID in the docker image with the containerized server.

7. The system of claim 6, wherein to register the containerized server, the processor-executable instructions further cause the processor to:
   register the containerized server using an extension point of the IDE; or
   upload the docker image to the docker hub using the metadata.

8. The system of claim 6, the processor-executable instructions further cause the processor to:
   receive the first request from the end user, using a first shortcut in the IDE, for creating the docker image.

9. The system of claim 6, wherein to create the docker image, the processor-executable instructions further cause the processor to:
   execute a docker file, wherein the docker file comprises the metadata corresponding to the project, or
   download the docker image from the docker hub.

10. The system of claim 6, the processor-executable instructions further cause the processor to:
    receive the second request from the end user, using a second shortcut in the IDE, for creating the docker container.

11. A non-transitory computer-readable medium storing computer-executable instruction for automatically creating an instance of a containerized server within an Integrated Development Environment (IDE), the computer-executable instructions configured for:
    registering a containerized server in a framework, upon a request from a server developer;
    creating a docker image from within the IDE upon a first request from an end user, wherein the docker image comprises metadata corresponding to a project, and wherein the metadata comprises a project runtime ID and a list of exposed ports;
    creating a docker container from within the IDE upon a second request from the end user, using the docker image and based on the metadata; and
    automatically creating and upon creating the docker container, an instance of the containerized server within the IDE by executing by the framework a wrapper class corresponding to the project runtime ID and to the containerized server, wherein the containerized server is associated with the docker container, and wherein the execution of the corresponding wrapper class is based on a match between the project runtime ID in the docker image with the containerized server.

12. The non-transitory computer-readable medium of claim 11, wherein registering the containerized server comprises one of:
    registering the containerized server using an extension point of the IDE; or
    uploading the docker image to a docker hub using the metadata.

13. The non-transitory computer-readable medium of claim 11, wherein the computer-executable instructions are further configured for:
    receiving the first request from the end user, using a first shortcut in the IDE, for creating the docker image.

14. The non-transitory computer-readable medium of claim 11, wherein creating the docker image comprises one of:
    executing a docker file, wherein the docker file comprises the metadata corresponding to the project, or
    downloading the docker image from a docker hub.

15. The non-transitory computer-readable medium of claim 11, wherein the computer-executable instructions are further configured for:
    receiving the second request from the end user, using a second shortcut in the IDE, for creating the docker container.

* * * * *